Patented May 19, 1931

1,805,855

UNITED STATES PATENT OFFICE

JAMES L. STEVENS, OF HAYDEN, ARIZONA, ASSIGNOR TO RACONITE CHEMICAL COMPANY, A CORPORATION OF ARIZONA

CONCENTRATION OF ORES, MINERALS AND THE LIKE

No Drawing.   Application filed January 15, 1929. Serial No. 332,741.

This invention relates to the concentration of ores, minerals and the like by flotation processes and particularly by the froth flotation processes, and the principal objects of the invention are the provision of certain improvements in such processes and in particular the improvement of such processes by utilization of reagents of a certain class, and having certain properties, as mineral collecting agents therein.

I have found that advantageous results may be obtained in the froth flotation processes by adding to the ore pulp a mineral collecting agent consisting of an organic sulphur product formed by reaction between a xanthate and disulphur-dichloride ($S_2Cl_2$) and containing substantially a 50% higher proportion of sulphur in relation to the organic radical than was contained in the xanthate from which it was prepared. Mineral collecting agents of this new type may be considered as having a general formula of $(R-OCS_3)_2$ in which R is the organic radical of the xanthate from which the agent is prepared and is in general any organic radical capable of forming a xanthate, such as alkyl radical or other suitable hydrocarbon or organic radical.

While the above general formula $$(R-OCS_3)_2$$

is given as representing the constituents of the compounds of the class used as mineral collecting agents according to this invention, it is to be understood that I do not wish to be restricted to any particular structural formula or arrangement of the atoms or radicals in the molecule in these reagents, as I am unable to state positively at the present time the exact structural arrangement thereof. However, the following example is submitted to give my present conception of a probable structural formula for these compounds.

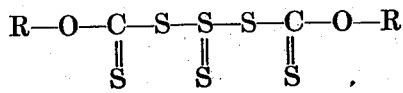

Various products having the above probable formula and suitable for use as mineral collecting agents in froth flotation processes have been prepared by treating various alkali metal xanthates with disulphur-dichloride. For example, the ethyl product, having the probable formula $(C_2H_5OCS_3)_2$, was prepared by slowly adding disulphur-dichloride ($S_2Cl_2$) to an agitated aqueous solution of potassium ethyl xanthate ($C_2H_5OCS_2K$). This product precipitated from the aqueous solution in the form of a heavy oil, having a specific gravity of approximately 1.41 at a temperature of 18° C., was collected and separated from the aqueous layer after completion of the reaction. The probable reaction in this case may be indicated by the following equation:

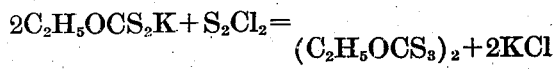

In using quantities of the ingredients in substantially the theoretical amounts, the above reaction will go substantially to completion, giving practically a theoretical yield of the organic sulphur product, although in general a slight excess (approximately 2 to 3% above the theoretical) of disulphur-dichloride is needed to fully complete the reaction. This appears to be due to some slight decomposition of the disulphur-dichloride by the water, which is preferably used to facilitate mixing and to aid in controlling the temperature of the reaction due to the considerable heat developed thereby.

It may be seen from the probable formula given above that the ratio of organic radical to sulphur atoms in the product is 1 to 3, while this ratio in the xanthate is 1 to 2, and in general it may be said that in these products the content of sulphur, in proportion to the organic radical, is approximately 50% greater than in the xanthates from which they are formed.

In making one particular batch of the above mentioned ethyl product in the laboratory, 320 grams of purified potassium ethyl xanthate were dissolved in one liter of water and placed in a wide mouth bottle equipped with a mechanical agitator. The xanthate solution was agitated and the disulphur-dichloride (approximately 138 grams) slowly added until the xanthate was completely exhausted, which was determined by testing the aqueous solution with copper sulphate. The contents of the flask were then allowed to stand and separate by gravity, and the desired product was separated by drawing off the water layer from above the same. The quantity of oily product recovered from this batch amounted to 96.8% of the theoretical yield based upon the quantity of xanthate employed.

The reaction between an alkali metal xanthate and disulphur-dichloride is exothermic, and the two substances in concentrated form generally react violently, producing excessive heat. Therefore, means for preventing excessive rise in temperature while the reaction is taking place may advantageously be employed, any suitable cooling means being provided for this purpose. It is also advantageous, as stated above, to disperse or dissolve the xanthate in a liquid medium in order to retard the reaction and assist in keeping the temperature within the desired limits, and water has been found to be a satisfactory liquid for this purpose. The temperature of the reaction may be further controlled by the rate at which the disulphur-dichloride is added. The optimum temperature of reaction, when using alkali metal xanthates containing an alkyl radical, appears to range between 40° and 70° C., although temperatures outside of this range may be employed without departing from the spirit of the invention, and when using xanthates containing other organic radicals, it may be that temperatures somewhat different than this will be found to be more satisfactory. If a lower temperature is maintained during the entire reaction, that is, a temperature of say 15 to 20° C., the product appears to have a tendency to form as a paste instead of a liquid. On the other hand, if the temperature becomes too high it is apt to result in some decomposition of the xanthate, it being well known that alkali metal xanthates are unstable in hot aqueous solutions, and may also result in partial decomposition of the product itself, such decomposition leading in either case to the formation of impurities which tend to darken or discolor the product. I, therefore, prefer in general to keep the batch relatively cool until the major portion of the disulphur-dichloride has been added and then allow the temperature to gradually rise at the end so as to complete the reaction after most of the xanthate has been exhausted.

Any suitable sequence of adding the various ingredients may be employed; however, I prefer to add the disulphur-dichloride to an aqueous solution of xanthate. The alkali metal chloride formed by the reaction may be removed in solution with the water after the reaction is complete.

For preparing the products of the present invention from various other xanthates, the same procedure as described for the ethyl product was employed. For example, the normal butyl and iso-amyl products were prepared by adding disulphur-dichloride to agitated aqueous solutions of the normal butyl sodium xanthate ($C_4H_9OCS_2Na.2H_2O$) and iso-amyl potassium xanthate $$(C_5H_{11}OCS_2K)$$

respectively. The amounts of the disulphur-dichloride and xanthates were employed in approximately molecular relation, i. e., using approximately one molecular equivalent of disulphur-dichloride to two molecular equivalents of each of the xanthates. Substantially, the theoretical yield of oil product was obtained in each case.

The specific gravity of the various products differs as a result of the difference in organic radical as is indicated by the following table:

Table I

| Reaction product (assumed formula) | Approximate s. g. at 18° C. |
|---|---|
| $(C_2H_5OCS_2)_2$ | 1.41 |
| Normal $(C_4H_9OCS_2)_2$ | 1.28 |
| Iso $(C_5H_{11}OCS_2)_2$ | 1.23 |

The product resulting from reasonably pure materials, in all of the specific examples above described, is quite fluid at ordinary temperatures, oleaginous in character, light yellow to amber in color, very soluble or miscible with many organic solvents including pine oil, gasoline, amyl chloride, etc., but less soluble in alcohol, and substantially insoluble in water although water appears to be capable of dissolving very small amounts.

I have employed crude xanthates, containing considerable amounts of impurities such as alkali metal thio-carbonates and sulphides, in the preparation of some of the compounds of the present invention. Such impurities also react with disulphur-dichloride, forming compounds which in some cases tend to darken the oil, but do not appear to hinder its effectiveness in flotation and other uses. Certain of these impurities appear to be removed by carefully washing the oil with a cold dilute solution of caustic alkali.

In general the crude oil product, as extracted from the aqueous solution after the reaction is complete, has a turbid appearance, which appears to be due to the presence of a small amount of entrapped moisture. The oil may be clarified by allowing same to stand and then filtering through a dry filter. Usually, the amount of residue remaining on the filter is negligible.

As an example of a product of the above general composition containing an organic radical other than an alkyl radical, I have prepared a substance, apparently containing the cyclohexanyl radical ($C_6H_{11}$), by reaction between sodium cyclohexanyl xanthate, $$C_6H_{11}OCS_2Na \cdot 2H_2O,$$

and disulphur-dichloride, using substantially the same procedure as above described. In a specific laboratory experiment using this cyclohexanyl xanthate, 15 grams of xanthate were dissolved in approximately 150 cc. of water in a flask, and disulphur-dichloride was then added thereto and agitated until the copper sulphate test indicated substantially complete exhaustion of the xanthate. The total amount of disulphur-dichloride added was about 5 grams or somewhat in excess of the theoretical requirement according to the possible reaction equation above mentioned.

The reaction in this case also was exothermic, the mixture being warmed somewhat by the heat produced thereby, although the relatively large proportion of water used retarded the reaction somewhat and prevented a great increase in temperature. The product formed in this case also separated from the aqueous layer in the form of a fluid substance apparently only slightly soluble in water and having a yellowish to amber color. Upon warming on the water bath, the product became quite fluid and separated at the bottom of the flask, being heavier than water. As before, the product was separated by simply decanting the water layer from above the same. Upon cooling to approximately room temperature, the product became thick and viscous or plastic, having the general appearance of a heavy viscous oil.

In the foregoing part of this specification I have described the crude product formed by reaction between a xanthate and sulphur chloride as being an oil, and in fact it is an oily liquid at the temperatures at which I prefer to carry out the reaction; nevertheless, as stated above, the product tends to form as a paste when the reaction takes place at lower temperatures, and at still lower temperatures may form as a solid. In one particular batch of the ethyl compound which was made at a temperature of about 15–20° C., a considerable amount of a crystalline solid formed after standing several days. The melting point of the crystalline solid was found to be about 37° C., and the molecular weight of same was found to check the assumed formula for the ethyl compound given above, under Table I. Therefore, the term "oil" might not be suitable for describing the compound under all conditions, as the pure products at the lower temperatures might be solids.

This application for patent is directed solely to the method of concentration of ores, minerals and the like with the use of mineral collecting agents of the type above described, and the above description of these products and the method of making the same is given merely in order to clearly define this novel class of agents and show how the same may be readily prepared.

In applying the above described reagents to the concentration of ores, minerals and the like by flotation processes, they may be introduced into the ore pulp in any suitable way and may be used in conjunction with any other suitable reagent or reagents which may also be employed to promote flotation; for instance, they may be introduced into the tube mill in which the ore is being ground or may be added to the ore pulp just before it enters the flotation cell, and may if desired be added in admixture with other reagents such as pine oil, in which they are in general readily soluble. However, in general, I prefer to subject these reagents to agitation with the ore pulp prior to entering the flotation cell and in some cases to apply them in admixture with solvents thereof to aid in dispersion throughout the ore pulp.

In general, these reagents come in the class of flotation reagents known to the art as "mineral collecting agents", and in general it is necessary to employ a suitable frothing agent in conjunction therewith in carrying out the froth flotation process. Of these various reagents I have found the reagent comprising the ethyl compound to be particularly effective as a mineral collecting agent, and when employed in conjunction with a suitable frothing agent, such as pine oil, in carrying out the froth flotation process, its collecting action appears to be unusually fast. It thus reduces, in some cases, the usual amount of time required to effect the desired recoveries.

The reagents of the present invention exhibit marked ability to cause only certain valuable minerals to be concentrated from an ore pulp containing objectionable minerals which ordinarily also tend to concentrate. For example, in ores containing a plurality of floatable minerals such as copper minerals and pyrite, these reagents exhibit a marked selective action on the copper minerals but show very little tendency to float pyrite under ordinary conditions. The pyrite may be caused to float, if desired, however, by increasing the amount of the reagent or by employing a suitable reagent in conjunction therewith to promote the flotation of the pyrite.

Due to the chemical nature of these reagents they are not easily destroyed by acids or soluble salts that frequently occur in ore pulps, and therefore may be applied to the treatment of certain ores which are refractory to certain other reagents.

The reagents of the present invention may be employed in alkaline, neutral or acid ore pulps. However, in general, I prefer to employ these reagents in an alkaline ore pulp, particularly when it is desirable to selectively separate one class of floatable mineral from another. The use of lime has been found very satisfactory for making the ore pulp alkaline. However, other suitable alkalis, such as caustic soda, soda ash, trona, or the like, may be employed.

The following table shows results obtained by applying various of the reagents of the present invention to the concentration of ore from the Ray mines of the Nevada Consolidated Copper Company. The collecting agent in test No. 1 was prepared from ethyl xanthate, that in test No. 2 from normal butyl xanthate, and that in test No. 3 from iso-amyl xanthate, of sodium or potassium, by substantially the method above described.

*Table I of metallurgical results*

| Test No. | Collecting agent | Lbs. per ton of ore | Headings | | Tailings | | Concentrates | | |
|---|---|---|---|---|---|---|---|---|---|
| | | | Per cent Cu. | Per cent Fe. | Per cent Cu. | Per cent Fe. | Per cent Cu. | Per cent Fe. | Per cent Ins. |
| 1 | Ethyl product | 0.12 | 1.28 | 3.12 | .15 | 1.26 | 16.2 | 28.2 | 13.6 |
| 2 | Butyl product | 0.12 | 1.28 | 3.12 | .16 | 1.88 | 21.6 | 22.9 | 18.1 |
| 3 | Iso-amyl product | 0.12 | 1.28 | 3.12 | .18 | 2.11 | 20.6 | 21.5 | 23.0 |

For the above tests the ore was prepared for flotation by crushing to minus 8 mesh, classifying the crushed ore by washing out the slimes with water and grinding the sands to a suitable fineness in a laboratory pebble mill. A total of five pounds of crude lime per ton of ore was used; one pound being added to the original ore prior to classifying, three pounds added to the sands prior to grinding in the pebble mill and one pound to the primary slimes. After grinding the sands, the ground sands and primary slimes were mixed and the collecting agent added. The pulp was then placed in the flotation machine and subjected to two minutes pre-agitation to facilitate dispersion of the reagent. Approximately 0.2 lb. of pine oil per ton of solids was then added and the pulp agitated to produce a mineral bearing froth. The mineral was removed by allowing same to overflow the cell with the froth.

For the following tests the ore was prepared by the same procedure as above described up to the point of adding the collecting agent. The collecting agent (the ethyl product) was mixed with pine oil prior to introducing into the ore pulp. The collecting agent and pine oil were mixed in volume proportions of 33⅓% and 66⅔% respectively. Additional straight pine oil was added as required to bring the total amount of pine oil up to approximately 0.2 lbs. per ton of solids. The amount of collecting agent ranged from .02 to .08 pounds per ton of ore.

*Table II Metallurgical results*

| Test No. | Total lime lbs./ton | Collecting agent (ethyl product) lbs./ton, added in admixture with pine oil | Total pine oil lbs./ton | Headings | | Tailings | | Concentrates | | |
|---|---|---|---|---|---|---|---|---|---|---|
| | | | | Per cent Cu. | Per cent Fe. | Per cent Cu. | Per cent Fe. | Per cent Cu. | Per cent Fe. | Per cent Ins. |
| 4 | 5.0 | 0.08 | 0.2 | 1.27 | 3.56 | .14 | 1.12 | 19.1 | 31.4 | 6.6 |
| 5 | 5.0 | 0.06 | 0.2 | 1.27 | 3.56 | .16 | 1.57 | 20.9 | 29.0 | 8.8 |
| 6 | 5.0 | 0.04 | 0.2 | 1.27 | 3.56 | .15 | 1.75 | 19.9 | 31.0 | 6.5 |
| 7 | 5.0 | 0.02 | 0.2 | 1.27 | 3.56 | .17 | 1.92 | 24.1 | 28.9 | 6.3 |

I claim:

1. The method of concentration of minerals by flotation which comprises adding to a mineral pulp a reagent comprising an organic sulphur bearing product formed by reaction of a xanthate with disulphur-dichloride ($S_2Cl_2$), and then subjecting the pulp to a froth flotation operation in the presence of such reagent.

2. The method of concentration of minerals by flotation which comprises adding to a mineral pulp a reagent comprising an organic sulphur bearing product formed by reaction of an alkali metal xanthate with disulphur-dichloride ($S_2Cl_2$), and then subjecting the pulp to a froth flotation operation in the presence of such reagent.

3. The method of concentration of minerals by flotation which comprises adding to a mineral pulp a reagent comprising an organic reaction product formed by adding disulphur-dichloride ($S_2Cl_2$) to an aqueous solution of a xanthate, and then subjecting the pulp to a froth flotation operation in the presence of such reagent.

4. The method of concentration of minerals by flotation which comprises adding to a mineral pulp a reagent comprising an organic sulphur-bearing product formed by reaction of an alkali metal alkyl xanthate with disulphur-dichloride ($S_2Cl_2$), and then subjecting the pulp to a froth-flotation operation in the presence of such reagent.

5. The method of concentration of minerals by flotation which comprises adding to a mineral pulp a reagent comprising an oily organic liquid, difficultly soluble in water and formed by adding disulphur-dichloride ($S_2Cl_2$) to an aqueous solution of an alkali metal alkyl xanthate, and then subjecting the pulp to a froth-flotation operation in the presence of such reagent.

6. The method of concentration of minerals by flotation which comprises adding to a mineral pulp a reagent comprising an organic compound having the chemical formula $(R-OCS_3)_2$ in which R is an organic radical, and then subjecting the pulp to a froth-flotation operation in the presence of such reagent.

7. The method of concentration of minerals by flotation which comprises adding to a mineral pulp a reagent comprising a compound having the chemical formula $(R-OCS_3)_2$ in which R is an organic radical capable of forming a xanthate, and then subjecting the pulp to a froth-flotation operation in the presence of such reagent.

8. The method of concentration of minerals by flotation which comprises adding to a mineral pulp a reagent comprising a compound having the chemical formula $(R-OCS_3)_2$ in which R is a hydrocarbon radical, and then subjecting the pulp to a froth-flotation operation in the presence of such reagent.

9. The method of concentration of minerals by flotation which comprises adding to a mineral pulp a reagent comprising a compound having the chemical formula $(R-OCS_3)_2$ in which R is an alkyl radical, and then subjecting the pulp to a froth-flotation operation in the presence of such reagent.

10. The method of concentration of minerals by flotation which comprises adding to a mineral pulp a reagent comprising an organic sulphur-bearing product formed by reaction, at a temperature between 40 and 70° C., between an alkali metal alkyl xanthate and disulphur-dichloride ($S_2Cl_2$), and then subjecting the pulp to a froth-flotation operation in the presence of such reagent.

11. The method of concentration of minerals by flotation which comprises adding to a mineral pulp a reagent comprising an organic sulphur bearing product formed by reaction, at a temperature between 40 and 70° C., between an alkali metal ethyl xanthate and disulphur-dichloride ($S_2Cl_2$), and then subjecting the pulp to a froth-flotation operation in the presence of such reagent.

12. The method of concentration of minerals by flotation which comprises adding to a mineral pulp a reagent comprising an organic sulphur bearing product formed by reaction between one molecular proportion of disulphur-dichloride ($S_2Cl_2$) and two molecular proportions of an alkali metal xanthate, and then subjecting the pulp to a froth-flotation operation in the presence of such reagent.

13. The method of concentration of minerals by flotation which comprises adding to a mineral pulp a reagent comprising an organic sulphur bearing product formed by reaction between one molecular proportion of disulphur-dichloride ($S_2Cl_2$) and an aqueous solution containing two molecular proportions of an alkali metal alkyl xanthate, and then subjecting the pulp to a froth-flotation operation in the presence of such reagent.

In testimony whereof I have hereunto subscribed my name this 11th day of January, 1929.

JAMES L. STEVENS.